McMILLEN & CONRICK.
Clothes Wringer.
No. 56,591.
Patented July 24, 1866.
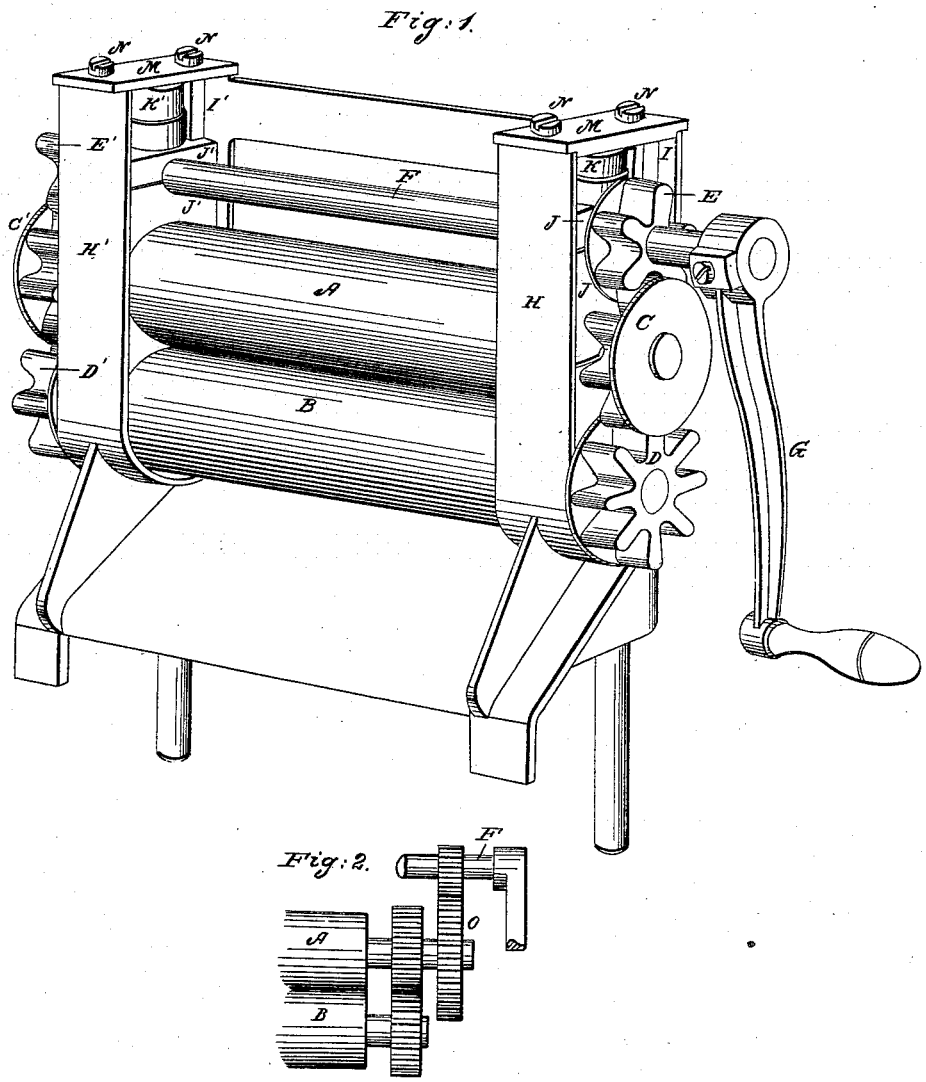

UNITED STATES PATENT OFFICE.

WM. T. McMILLEN, OF CINCINNATI, OHIO, AND EDWD. P. CONRICK, OF DELAVAN, WISCONSIN.

IMPROVEMENT IN CLOTHES-WRINGERS.

Specification forming part of Letters Patent No. 56,591, dated July 24, 1866.

*To all whom it may concern:*

Be it known that we, WILLIAM T. McMILLEN, of Cincinnati, Hamilton county, State of Ohio, and EDWARD P. CONRICK, of Delavan, Walworth county, State of Wisconsin, have invented certain new and useful Improvements in Clothes-Wringing Machines; and we do hereby declare the following to be a full, clear, and exact description thereof, reference being had to the accompanying drawings, making part of this specification.

Our invention consists in gearing the rollers in such a manner as to give an increase of leverage for the operator and relieve the rolls of greater part of the twisting strain common to this class of machines.

In the accompanying drawings, Figure 1 is a perspective view of a clothes-wringer embodying our invention. Fig. 2 is a modification of the same.

A and B are, respectively, the upper and lower rolls of the wringer, geared together at both ends by pinions C C' and D D', and operated by connection at both ends with the pinions E E' on the counter-shaft F. The shaft F is operated by the ordinary handle G. The rolls and counter-shaft are journaled in suitable housings H H', which are provided with slides I I', on which the boxes J J' slide.

K K' are rubber springs, kept in place by straps and bolts M M N.

We have ascertained by careful experiments that by gearing the rolls at both ends they can be operated with much greater ease, and with but little twisting strain of the gum on the shaft.

In the wringer-machines now in use the torsion of the gum is so great that the roller to which the power is applied is so much twisted as to shortly become loose on the shaft, and, of course, useless. As the gum rollers are much the most expensive parts of the machine their durability is quite an object.

By the use of the counter-shaft F and pinions E E', of smaller diameters than the pinions on the roller-shafts, an increase of mechanical power or leverage is gained over the rollers, and thick heavy articles, such as bed-quilts, can be run through the machine with great ease.

In the modification (Fig. 2) an additional pinion, O, is secured to the shaft of the roller A, and meshes into a suitable pinion on the counter-shaft F. By this device a still greater leverage can be obtained over the rollers, as the wheel O can be of larger diameter than the pinions of the rollers.

Though the device as exhibited in Fig. 1 is the preferred type of our invention, we do not desire to restrict ourselves to this precise form. An inferior modification may consist in gearing the rollers together, and with the counter-shaft, at one end only.

We claim herein as new and of our invention—

The counter-shaft F, having pinions E E' at both ends, in the described combination with the pair of doubly-geared wringer-rolls A C C' and B D D', for the purpose explained.

In testimony of which invention we hereunto set our hands.

WILLIAM T. McMILLEN.
E. P. CONRICK.

Witnesses:
FRANK MILLWARD,
JAMES H. LAYMAN.